Dec. 13, 1932.  E. H. BENN  1,891,040
TOP FOR RUMBLE SEATS OF AUTOMOBILES
Filed Nov.2, 1929  3 Sheets-Sheet 1

Inventor.
Edward H. Benn
by Heard Smith & Tennant.
Attys.

Dec. 13, 1932.　　　　E. H. BENN　　　　1,891,040
TOP FOR RUMBLE SEATS OF AUTOMOBILES
Filed Nov. 2, 1929　　　3 Sheets-Sheet 2

Inventor.
Edward H. Benn
by Heard Smith & Tennant.
Attys.

Dec. 13, 1932.  E. H. BENN  1,891,040
TOP FOR RUMBLE SEATS OF AUTOMOBILES
Filed Nov. 2, 1929   3 Sheets-Sheet 3
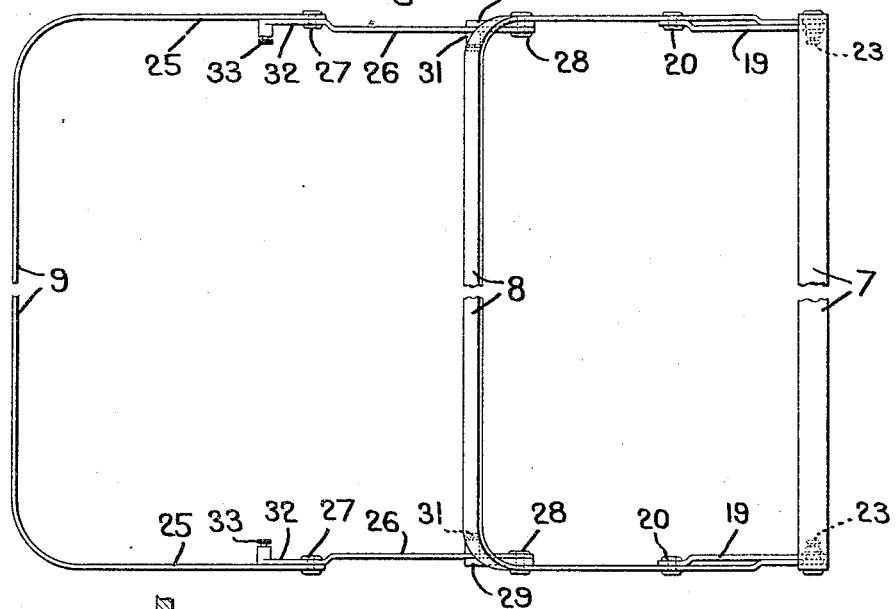
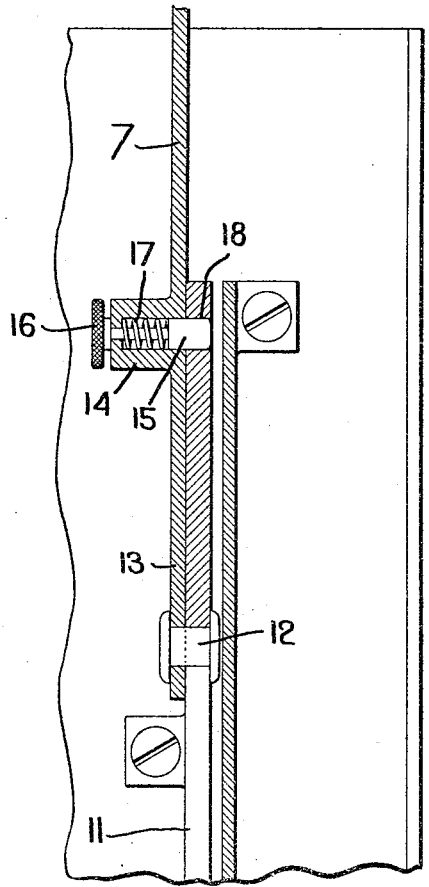
Inventor.
Edward H. Benn
by Heard Smith & Tennant
Attys.

Patented Dec. 13, 1932

1,891,040

UNITED STATES PATENT OFFICE

EDWARD H. BENN, OF BOSTON, MASSACHUSETTS, ASSIGNOR TO RUMBLETOP CORPORATION, OF BOSTON, MASSACHUSETTS, A CORPORATION OF MASSACHUSETTS

TOP FOR RUMBLE SEATS OF AUTOMOBILES

Application filed November 2, 1929. Serial No. 404,275.

This invention relates to automobiles which are equipped with a rumble seat and particularly to a top for the rumble seat and the object of the invention is to provide a novel rumble seat top which can be folded and stored in the back of the rumble seat.

In order to give an understanding of the invention I have illustrated in the drawings a selected embodiment thereof which will now be described after which the novel features will be pointed out in the appended claims.

Fig. 3 is a top plan view of the top frame;

Fig. 4 is a fragmentary view showing the manner of locking the frame in raised position.

Figure 1:
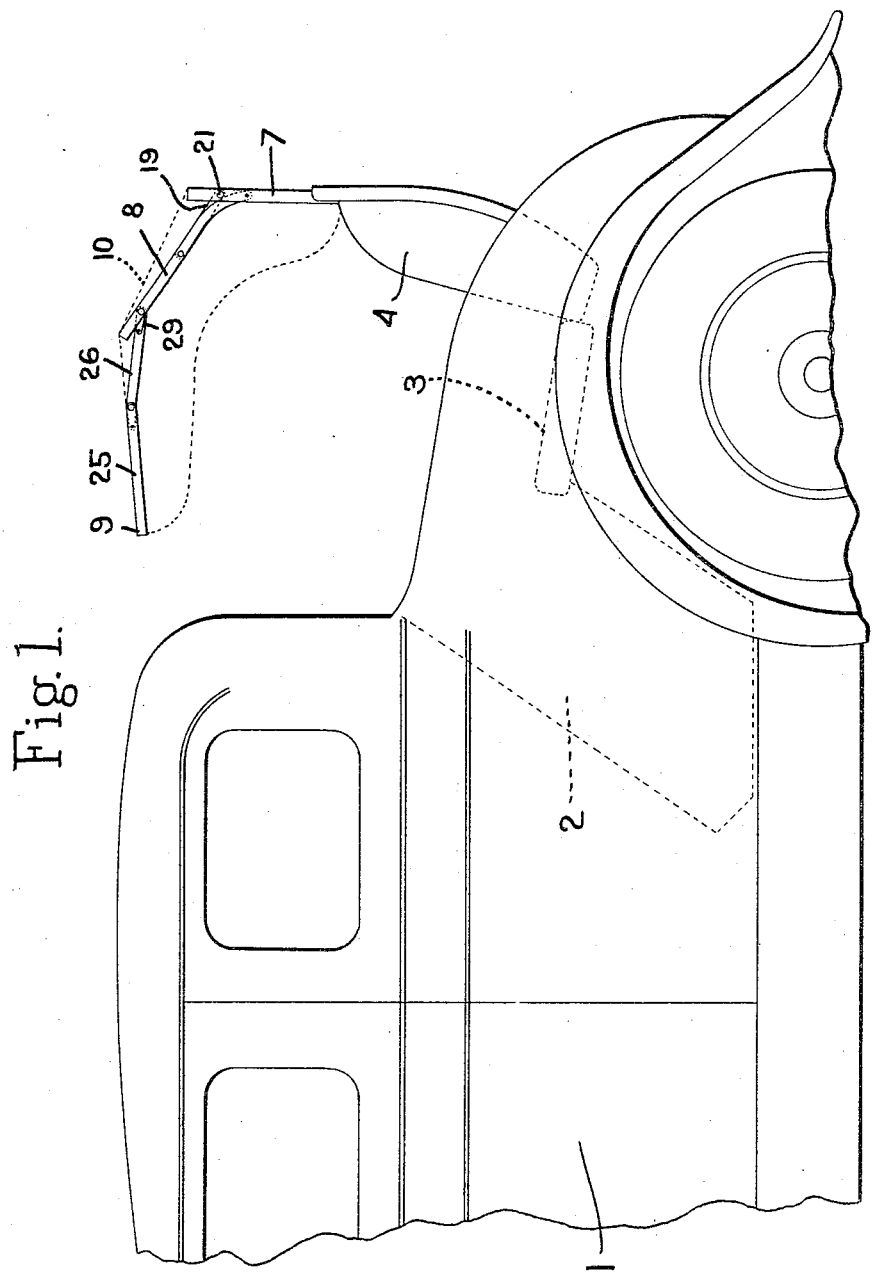
Fig. 1 is a fragmentary view of an automobile equipped with a rumble seat and embodying my invention.
Figure 2:
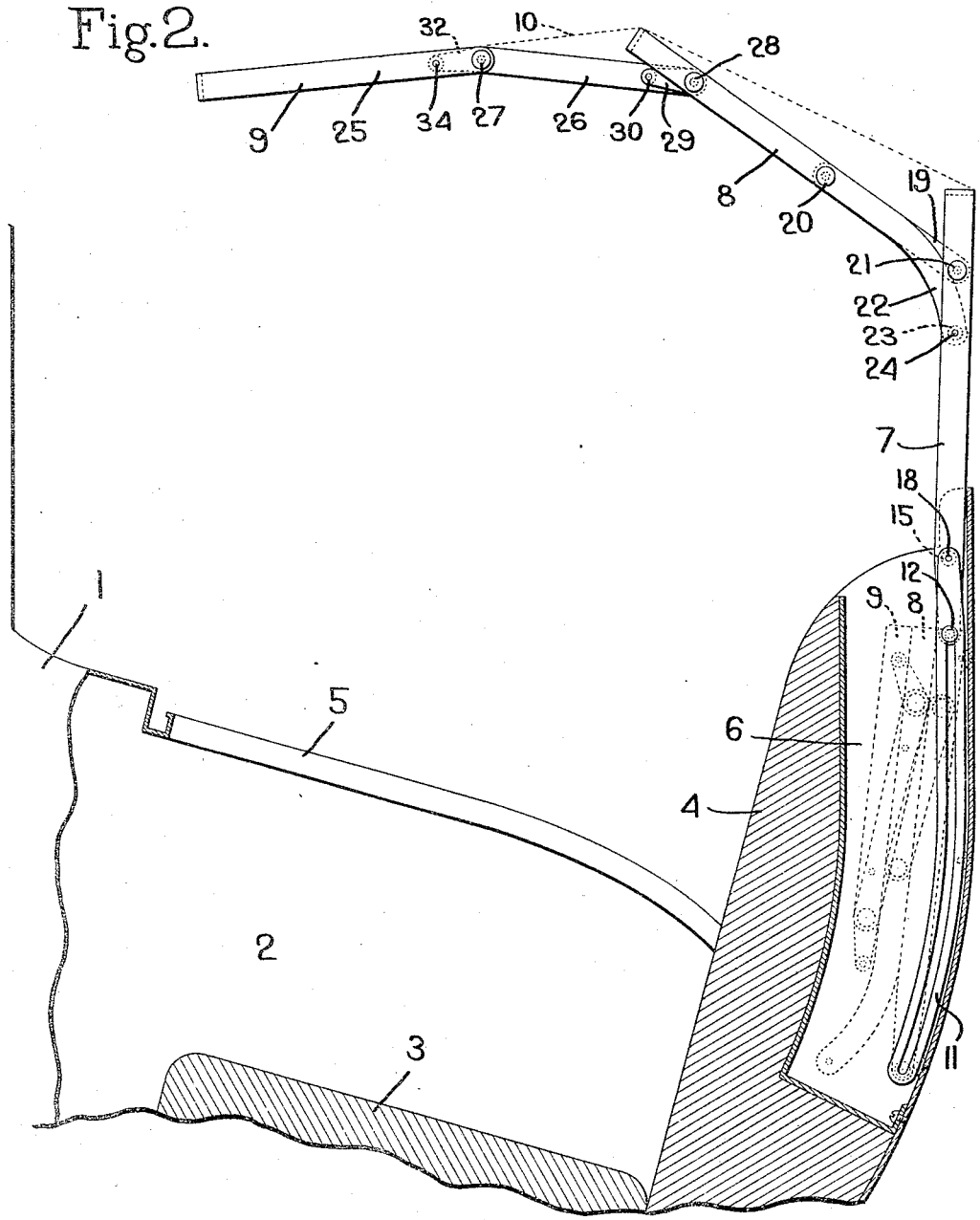
Fig. 2 is an enlarged view of the back of the rumble seat and the top frame, said view showing in dotted lines the top stored in a compartment formed in the back of the rumble seat.

In the drawings 1 indicates a portion of an automobile of the type which is equipped with a rear compartment 2 and a rumble seat 3 therein. 4 is the back of the rumble seat, which it will be understood is pivotally mounted so that when it is closed down it forms a closure for the opening 5 leading to the rear compartment and constitutes part of the rear deck of the car.

In accordance with my invention the back 4 of the rumble seat is provided with a compartment 6 adapted to receive a folding top for the rumble seat, said top being so constructed that it may be withdrawn from the compartment and opened to protect the occupants of the rumble seat. When the top is folded and stored in the compartment 6 it is entirely concealed.

The top herein shown comprises a folding frame which is formed with a rear bow 7 adapted to be held in upright position at the back of the rumble seat, a second bow 8 which projects forwardly from the upper end of the rear bow 7 and, if desired, a third or front bow 9 which projects forwardly from the bow 8, these bows being covered by a suitable top material indicated in dotted lines at 10.

The bows 8 and 9 are constructed to fold against the bow 7 and said bow 7 is adapted to be carried into and withdrawn from the compartment 6. As herein shown the said compartment 6 has at each side a slotted guideway 11, in the slot of which operates a stud or pin 12 carried by the lower end 13 of the corresponding arm of the bow 7. This construction provides for raising the bow 7 from the compartment 6 and lowering it into the compartment.

Means are provided for locking each arm of the bow 7 to the upper end of the guide 11 so that when the bow is withdrawn it may be held rigidly in upright position. For this purpose I have shown each arm of the bow 7 as provided with a boss 14 in which operates a spring-pressed locking plunger 15, each plunger having a head 16 by which it may be manipulated and being backed by a spring 17 which is located in the boss 14. These locking plungers 15 are adapted to engage apertures 18 formed in the upper ends of the guides 11 when the bow 7 is raised.

The engagement of the locking pins 15 in the apertures 18 together with the studs 12 in the slots of the guides 11 serve to hold the bow rigidly in elevated position.

The bow 8 is connected to the bow 7 through the medium of two links 19 which are pivoted to the bow 8 at 20 and to the bow 7 at 21. The ends 22 of the arms of the bow 8 are provided with spring-pressed locking plungers 23, similar to the plunger 15, which are adapted to be engaged in apertures 24 formed in the bow 7 thereby holding the bow 8 braced in its operative position.

The front bow 9 is made with sectional arms, the two sections of each arm being indicated at 25 and 26 respectively. These sections are pivoted together at 27 and the arm sections 26 are pivoted at 28 to the bow 8. This bow 8 has rigid with it two brace arms 29 each provided with an aperture 30 to receive a spring-pressed locking plunger 31 carried by the bow sections 26. The bow sections 26 are also provided with forward projections 32 which carry spring-pressed locking pins 33 adapted to engage in apertures 34 in the bow sections 25.

When the top is opened out the ends 22 of the arms of the bow 8 are locked to the bow 7 by the locking plungers 23 engaging in the apertures 24 of said bow 7 and the two sections 25, 26 of each arm of the bow 9 are rigidly locked together by the locking plungers 35 in the apertures 34. Similarly, the bow 9 as a whole is locked and held in its forwardly-extending substantially horizontal position by the engagement of the locking plungers 31 engaging in the apertures 30 of the extensions 29 that are rigid with the bow 8. When thus opened out the top frame constitutes a rigid structure which holds the top material 10 expanded.

The top may be folded by withdrawing the locking plungers 33 to allow the sections 25 of the bow 9 to be folded against the sections 26 and the folded bow 9 may then be folded against the bow 8 by withdrawing the locking pins 31 from the apertures 30. The bow 8 may be folded against the bow 7 by withdrawing the locking projections 23 from the apertures 24 and swinging the lower end of said bow 8 downwardly and the upper end backwardly. By this operation the entire top frame is folded against the front side of the bow 7 and after this has been done the locking projections 15 may be withdrawn from the apertures 18 thus permitting the folded top to slide down into the compartment 6.

The device is very simple in construction and the top can be quickly opened up and as quickly folded and stored in the compartment 6.

I claim:

The combination with an automobile having a rear compartment equipped with a rumble seat, of a pivoted back for said seat which also constitutes a closure for said compartment, said seat back having a top-storing compartment located therein, two guide members fixed in said compartment, one at each end thereof, the upper end of each guide member coming substantially flush with the mouth of the compartment and having a locking aperture and each guide member having a slot extending from a point below said aperture to the bottom thereof, a folding top comprising a rigid rear bow having legs of fixed length and other bows extensible forwardly from the rear bow and collapsible thereagainst, the legs of said rear bow having projections at their lower ends which operate in the slots of said guides, and a spring-pressed locking pin carried by each leg of said rear bow and adapted to enter the locking aperture in the corresponding guide member when the bow is fully raised with the projections at the upper ends of the slots, said top when in folded position being storable in said compartment.

In testimony whereof, I have signed my name to this specification.

EDWARD H. BENN.